US012801067B2

(12) United States Patent
Kawasaki et al.

(10) Patent No.: US 12,801,067 B2
(45) Date of Patent: Nov. 17, 2026

(54) FIXING DEVICE AND IMAGE FORMING APPARATUS

(71) Applicant: KYOCERA Document Solutions Inc., Osaka (JP)

(72) Inventors: Hiroki Kawasaki, Osaka (JP); Ryohei Tokunaga, Osaka (JP); Kenichi Kasama, Osaka (JP); Shunsaku Fujii, Osaka (JP); Yuto Masaoka, Osaka (JP); Takashi Miyake, Osaka (JP); Akihiro Kondo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/097,480

(22) Filed: Apr. 1, 2025

(65) Prior Publication Data

US 2025/0321517 A1 Oct. 16, 2025

(30) Foreign Application Priority Data

Apr. 12, 2024 (JP) ................................ 2024-064540

(51) Int. Cl.
*G03G 15/20* (2006.01)
*G03G 15/00* (2006.01)

(52) U.S. Cl.
CPC ..... *G03G 15/2028* (2013.01); *G03G 15/2064* (2013.01); *G03G 15/6573* (2013.01); *G03G 2215/00413* (2013.01); *G03G 2215/2025* (2013.01)

(58) Field of Classification Search
CPC .......... G03G 15/2028; G03G 15/2064; G03G 15/6573; G03G 2215/00413; G03G 2215/2025; G03G 2215/00417
See application file for complete search history.

(56) References Cited

U.S. PATENT DOCUMENTS

2012/0251204 A1* 10/2012 Takahashi .......... G03G 15/2028 399/323
2022/0357697 A1* 11/2022 Furuichi ............ G03G 15/2053
2023/0408959 A1* 12/2023 Someya ............. G03G 15/2028
2025/0076797 A1* 3/2025 Ishigaya ............ G03G 15/2028

FOREIGN PATENT DOCUMENTS

JP 2018-045247 A 3/2018

* cited by examiner

*Primary Examiner* — Sandra Brase
(74) *Attorney, Agent, or Firm* — Studebaker Brackett PLLC

(57) ABSTRACT

A fixing device includes a fixing belt, a pressing member, a heater, and a separation member. The separation member comes into contact with a surface of the pressing member and peels off the medium passed through the pressure region, from the surface of the pressing member. The heater includes a base board, and a plurality of resistance heating elements. The base board is made of insulator and extends the in axial direction corresponding to the fixing belt. The resistance heating elements are arranged on one surface of the base board, where faces an inner surface of the fixing belt, with gaps in the axial direction, and generates heat by being energized. The separation member has at least one separation claw which is in contact with the surface of the pressing member at a position displaced in the axial direction relative to the gaps.

5 Claims, 6 Drawing Sheets

FIXING DEVICE AND IMAGE FORMING APPARATUS

INCORPORATION BY REFERENCE

This application is based on and claims the benefit of priority from Japanese patent application No. 2024-064540 filed on Apr. 12, 2024, which is incorporated by reference in its entirety.

BACKGROUND

The present disclosure relates to a fixing device which fixes a toner image to a medium and an image forming apparatus.

An electrophotographic image forming apparatus includes a fixing device which thermally fixes toner on a paper (medium). For example, the fixing device includes a rotating endless belt, a pressing roller which forms a nip (pressure region) between the endless belt and the pressing roller, and presses the paper (toner) passing through the nip while rotating, and a heating member which comes into contact with the inner surface of the endless belt and heats the endless belt. The heating member has a plurality of heating resistance elements arranged via gaps (creeping distance) in the axial direction (perpendicular direction) of the endless belt.

In the fixing device described above, a surface temperature of the endless belt and the pressing roller is lower at a position facing the gaps without the heating elements than at the position facing the heating elements. Further, in the fixing device as described above, since the paper passed through the nip may stick to the surface of the pressing roller, a separation member may be provided so as to be in contact with the surface of the pressing roller. Here, when the separation member is in contact with the surface of the pressing roller at the position corresponding to the gaps, the surface temperature of the pressing roller further decreases at the contact position of the separation member because the separation member absorbs heat from the surface of the pressing roller. As a result, the temperature at the nip becomes uneven in the axial direction, and the toner cannot be properly fixed to the paper.

SUMMARY

A fixing device according to the present disclosure includes a fixing belt, a pressing member, a heater, and a separation member. The fixing belt is formed in a cylindrical shape and rotates around an axis to heat toner on a medium. The pressing member forms a pressure region with the fixing belt and pressurizes the toner on the medium passing through the pressure region while rotating around an axis. The heater extends in the axial direction of the fixing belt, comes into contact with an inner surface of the fixing belt facing the pressure region, and heats the fixing belt. The separation member comes into contact with a surface of the pressing member and peels off the medium passed through the pressure region, from the surface of the pressing member. The heater includes a base board, and a plurality of resistance heating elements. The base board is made of insulator and extends in the axial direction corresponding to the fixing belt. The resistance heating elements are arranged on one surface of the base board, where faces an inner surface of the fixing belt, with gaps in the axial direction, and generates heat by being energized. The separation member has at least one separation claw which is in contact with the surface of the pressing member at a position displaced in the axial direction relative to the gaps.

An image forming apparatus includes the fixing device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
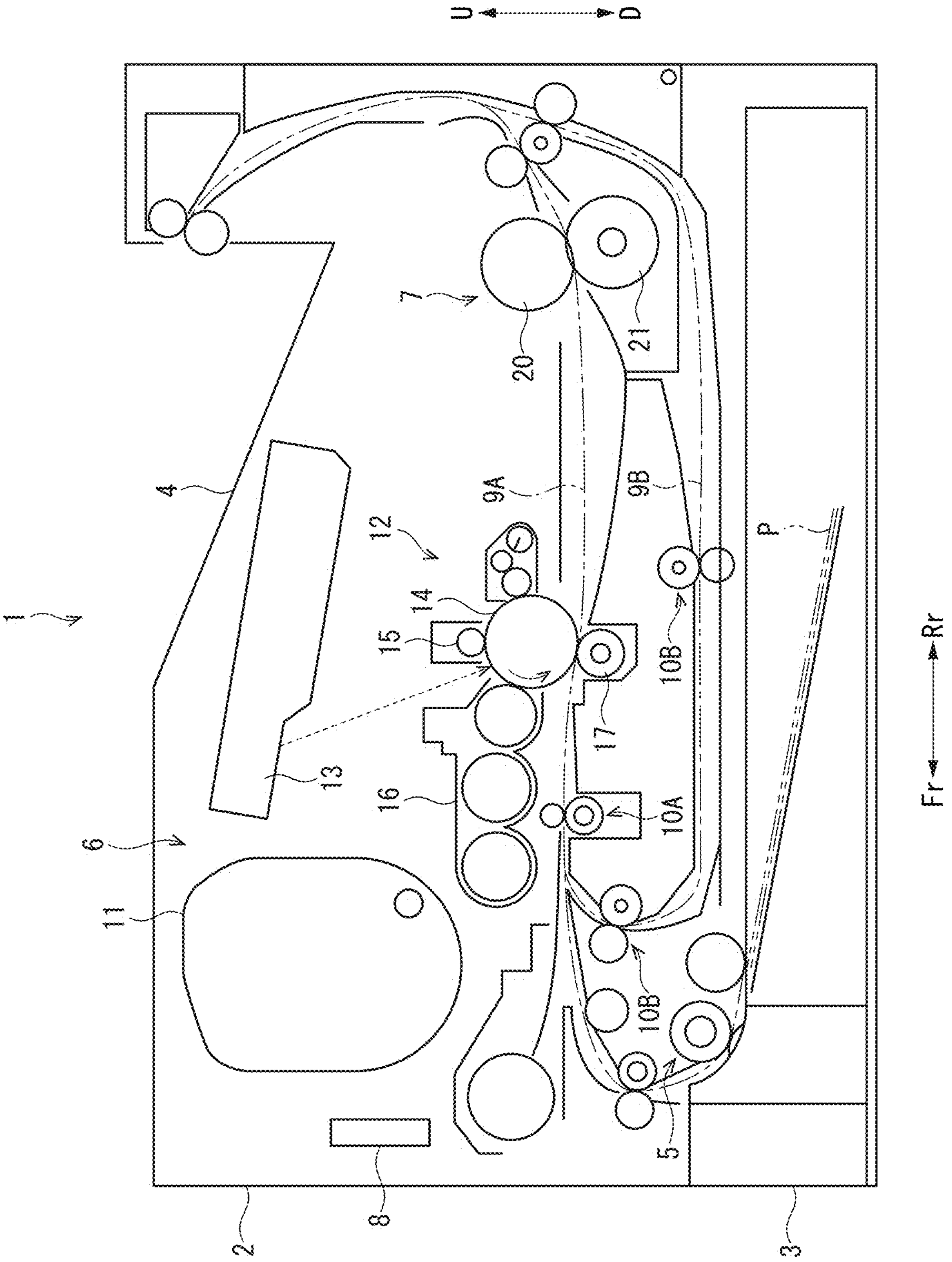
FIG. 1 is a schematic view (side view) showing the internal structure of an image forming apparatus according to one embodiment of the present disclosure.

Hereinafter, with the attached drawings, embodiments of the present disclosure will be described. Fr, Rr, L, R, U and D shown in the drawings indicate the front, rear, left, right, upper and lower. The front-and-rear direction, the left-and-right direction (axial direction) and the upper-and-lower direction are orthogonal to each other. Although terms showing directions and positions are used herein, these terms are used for convenience of description and do not limit the technical scope of the present disclosure. The terms "upstream", "downstream" and the like refer to the "upstream", "downstream" and the like in the passing direction (conveyance direction) of the paper P (medium). In each of the figures, the dimensions and angles of the members are not accurate and are schematized for the sake of illustration.

With reference to FIG. 1, the image forming apparatus 1 according to the embodiment will be described. FIG. 1 is a schematic view (side view) showing the image forming apparatus 1.

The image forming apparatus 1 is an electrophotographic printer. The image forming apparatus 1 is provided with an apparatus main body 2 constituting a substantially rectangular parallelepiped appearance. In the lower portion in the apparatus main body 2, a paper feeding cassette 3 in which a paper P (medium) is stored is detachably provided. On the upper surface of the apparatus main body 2, a paper discharge tray 4 is provided. The paper P as an example of the medium is not limited to a paper but may be a resin sheet or the like.

The image forming apparatus 1 includes a paper feeding device 5, an image forming device 6, and a fixing device 7. The paper feeding device 5 is provided at the upstream end of a conveyance path 9A extending from the paper feeding cassette 3 to the paper discharge tray 4, and feeds the paper P stored in the paper feeding cassette 3 to the conveyance path 9A one by one. The image forming device 6 is provided in the middle portion of the conveyance path 9A, and forms a toner image on the conveyed paper P. The fixing device 7 is provided on the downstream side portion of the conveyance path 9A, and thermally fixes the toner image to the paper P.

On the conveyance path 9A, a pair of registration rollers 10A for temporarily blocking the conveyed paper P and correcting the skew of the paper P (skew correction) is provided. An inversion conveyance path 9B is provided below the conveyance path 9A, which branches from the downstream portion of the conveyance path 9A and merges with the upstream portion of the conveyance path 9A. On the inversion conveyance path 9B, a plurality of pairs of conveying rollers 10B for conveying the paper P is provided.

The image forming device 6 includes a toner container 11, a drum unit 12, and an optical scanner 13. The toner container 11 is disposed in the front upper portion in the apparatus main body 2, and contains, for example, black toner (developer). The drum unit 12 includes a photosensitive drum 14, a charging device 15, a developing device 16, and a transfer roller 17. The photosensitive drum 14 is formed in a substantially cylindrical shape, and is driven to be rotated around an axis by a motor (not shown). The charging device 15, the developing device 16 and the transfer roller 17 are arranged around the photosensitive drum 14 in the order of the image forming process. The transfer roller 17 is in contact with the photosensitive drum 14 from the lower side to form a transfer nip. The optical scanner 13 is provided above the photosensitive drum 14, and emits scanning light toward the surface of the photosensitive drum 14.

The image forming apparatus 1 is provided with a control device 8 for controlling the entire apparatus. The control device 8 may be configured by a processor or a logic circuit (hardware) formed in an integrated circuit or the like. In the case of a processor, various processes are performed by the processor reading and executing programs stored in memory. For example, a CPU (Central Processing Unit) is used as the processor. The memory is composed of one or a plurality of storage devices such as ROM (Read Only Memory) and RAM (Random Access Memory) according to the application.

[Image Forming Process] The operation of the image forming apparatus 1 will be described. A control device (not shown) for controlling the image forming apparatus 1 performs the image forming process based on image data input from an external terminal as follows.

The charging device 15 charges the surface of the photosensitive drum 14, and the optical scanner 13 emits the scanning light based on the image data to form an electrostatic latent image on the photosensitive drum 14. The developing device 16 develops the electrostatic latent image to a toner image on the photosensitive drum 14 by using the toner supplied from the toner container 11. The paper feeding device 5 feeds the paper P one by one from the paper feeding cassette 3 to the conveyance path 9A. The paper P is conveyed along the conveyance path 9A, the skew of the paper P is corrected by the pair of registration rollers 10A, and then the paper P enters the transfer nip. The transfer roller 17 transfers the toner image on the photosensitive drum 14 to the surface of the paper P passing through the transfer nip. The fixing device 7 thermally fixes the toner image to the paper P. In the case of single-sided printing, the paper P which has passed through the fixing device 7 is discharged to the paper discharge tray 4.

In the case of double-sided printing, the paper P which has passed through the fixing device 7 is switched back at the downstream end of the conveyance path 9A, and sent to the inversion conveyance path 9B. The paper P is conveyed by the pairs of conveying rollers 10B, returned from the inversion conveyance path 9B to the conveyance path 9A again, and sent to the transfer nip after the skew correction by the pair of registration rollers 10A. Thereafter, the toner image is transferred to the paper P, thermally fixed, and the double-sided printed paper P is discharged to the paper discharge tray 4.

Figure 2:
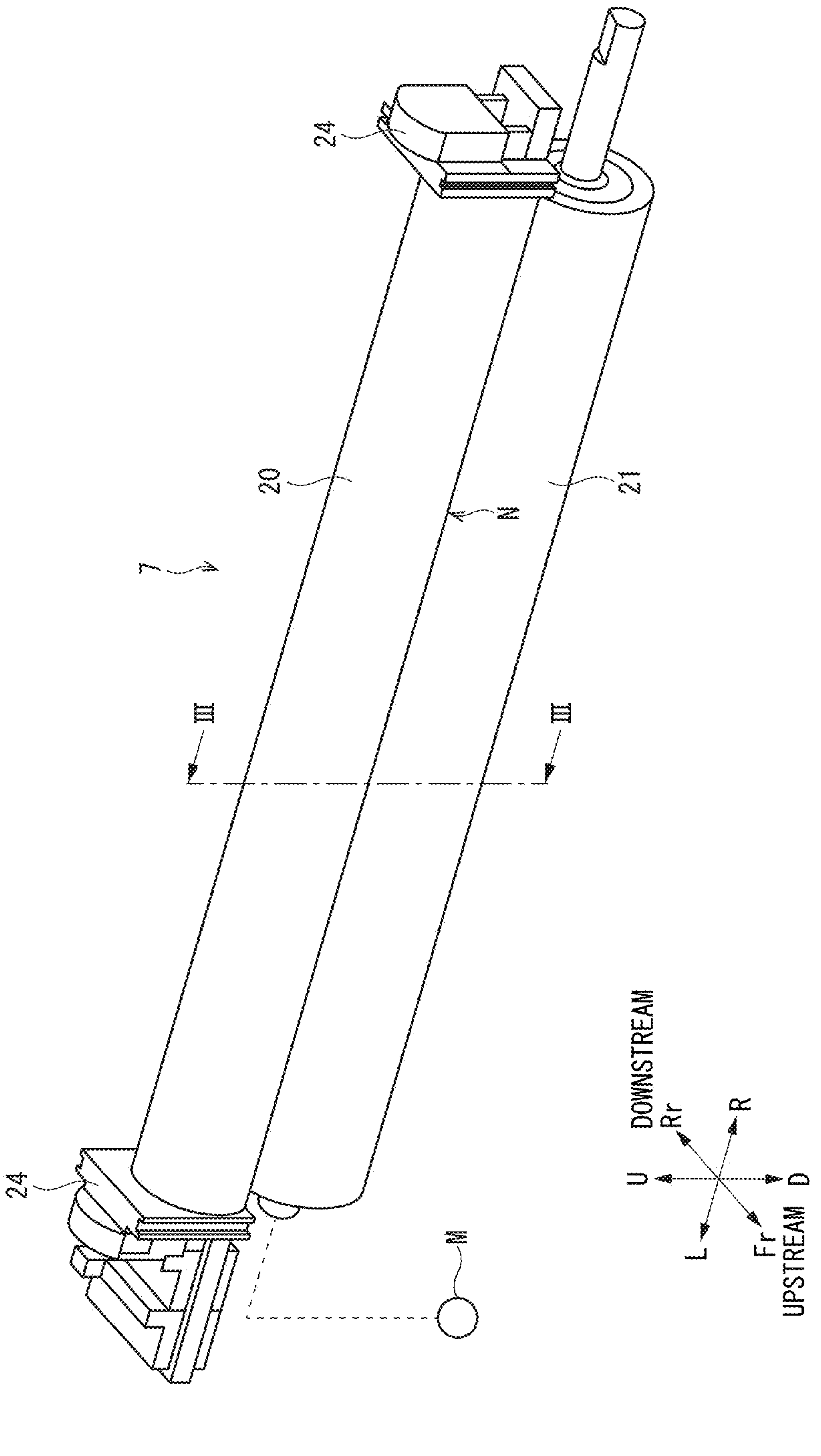
FIG. 2 is a perspective view showing a fixing device according to the embodiment of the present disclosure.
Figure 3:
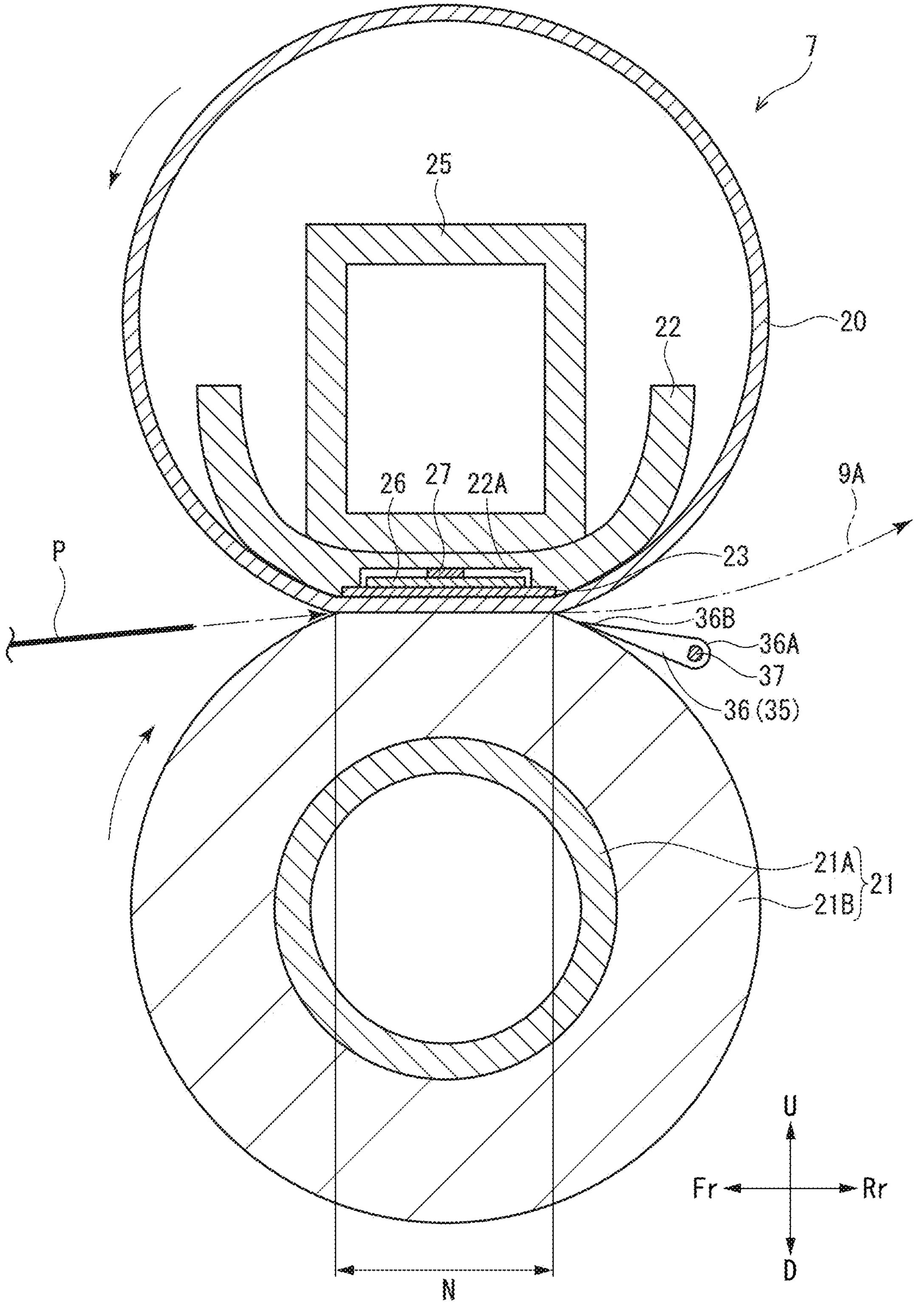
FIG. 3 is a cross-sectional view taken along the line III-III of FIG. 2.
Figure 4:
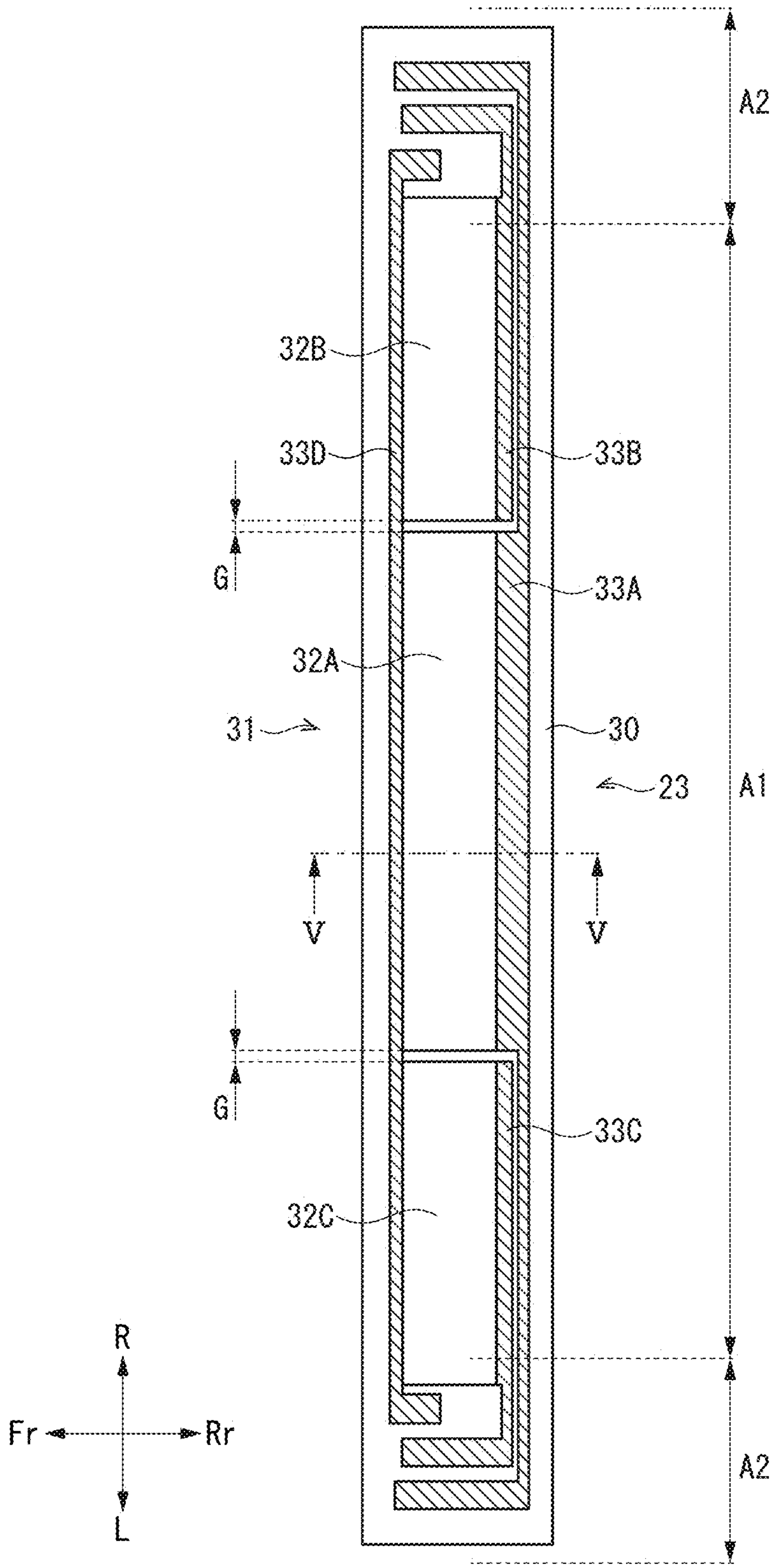
FIG. 4 is a bottom view schematically showing a heater of the fixing device according to the embodiment of the present disclosure.
Figure 5:
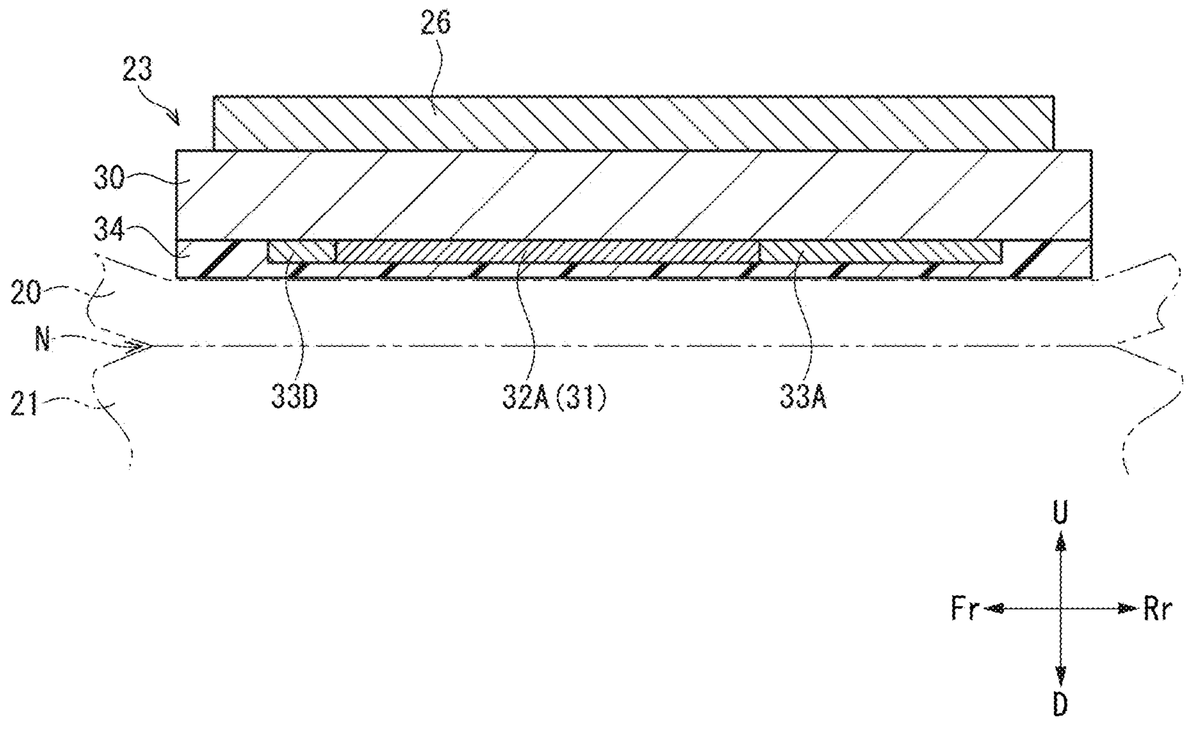
FIG. 5 is a cross-sectional view taken along the line V-V of FIG. 4.
Figure 6:
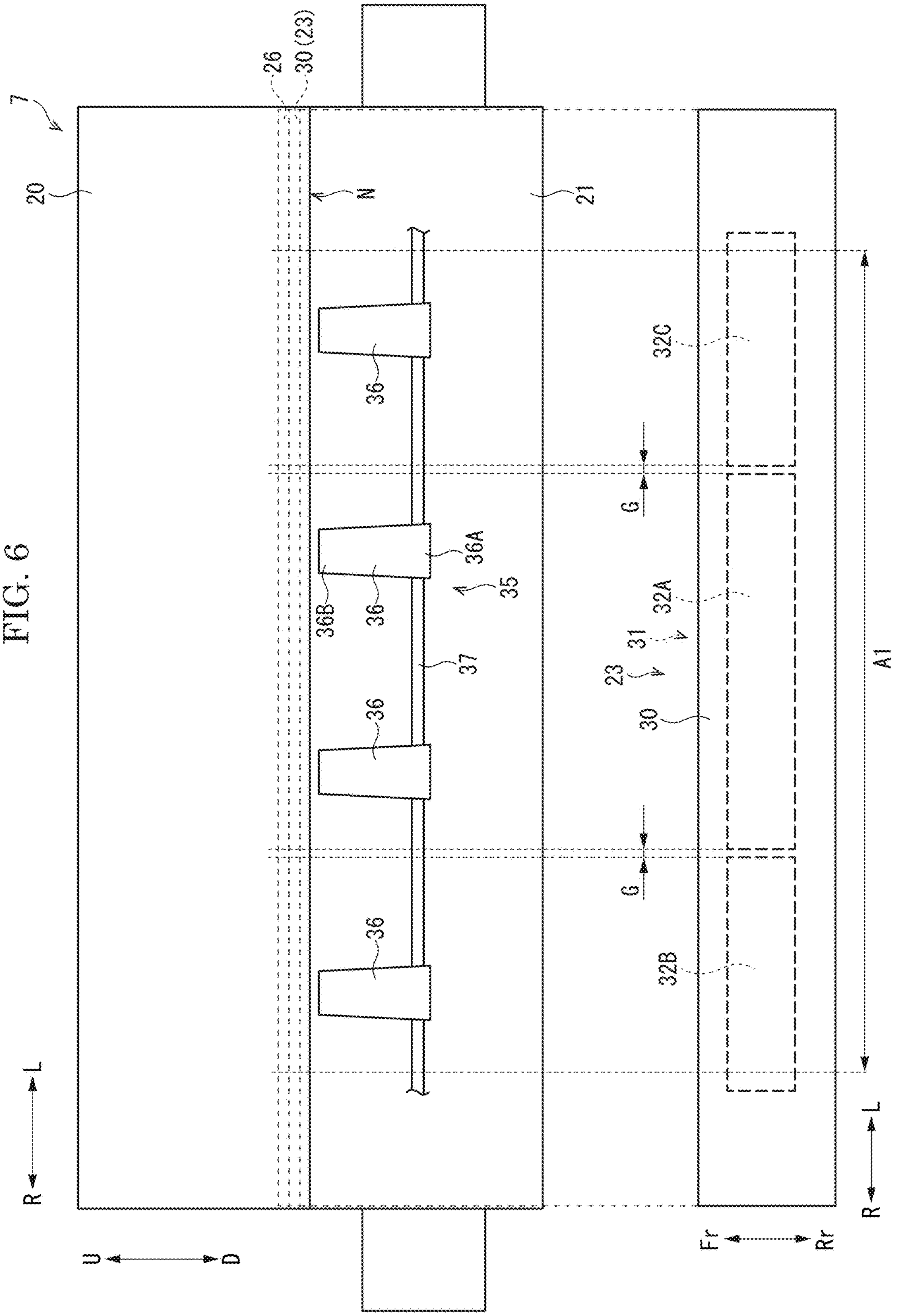
FIG. 6 is a rear view showing the fixing device according to the embodiment of the present disclosure, and explains the positional relationship between the heater and a separation member.

[Fixing Device] Next, with reference to FIG. 2 to FIG. 6, the fixing device 7 will be described. FIG. 2 is a perspective view showing the fixing device 7. FIG. 3 is a cross-sectional view taken along the line III-III of FIG. 2. FIG. 4 is a bottom view schematically showing the heater 23. FIG. 5 is a cross-sectional view taken along the line V-V of FIG. 4. FIG. 6 is a rear view showing the fixing device 7.

The fixing device 7 includes a fixing belt 20, a pressing roller 21, a heater 23, a heat equalizing member 26, and a separation member 35. The fixing belt 20 and the pressing roller 21 are supported by a frame (not shown), and the frame is fixed to the apparatus main body 2.

<Fixing Belt> As shown in FIG. 2 and FIG. 3, the fixing belt 20 is an endless belt formed in a substantially cylindrical shape elongated in the left-and-right direction (axial direction). The fixing belt 20 is made of material having heat resistance and flexibility (polymer resin or metal, or combination of polymer resin and metal). A pair of holding members 24 (see FIG. 2) are inserted into both right and left end portions of the fixing belt 20. The pair of holding members 24 guide the fixing belt 20 rotatably around an axis while holding the fixing belt in a substantially cylindrical shape. The fixing belt 20 is supported by the frame via the pair of holding members 24 (not shown).

As shown in FIG. 3, a support member 25 and a heater holder 22 are provided in a space surrounded by the fixing belt 20. The support member 25 is made of, for example, metallic material such as stainless steel, and formed in a substantially rectangular cylindrical shape elongated in the left-and-right direction (axial direction), and is provided between the pair of holding members 24. The heater holder 22 is fixed to the lower portion of the support member 25. The heater holder 22 is made of, for example, synthetic resin having heat resistance and wear resistance, and formed in a substantially semi-cylindrical shape elongated in the left-and-right direction. The heater holder 22 is curved along the inner surface of the fixing belt 20, and is in contact with the lower side inner surface of the fixing belt 20 (the pressure region N side inner surface). A fitting portion 22A into which the heater 23 is fitted is recessed in the lower portion of the heater holder 22.

<Pressing Roller> As shown in FIG. 2 and FIG. 3, the pressing roller 21 as an example of the pressing member is formed in a substantially cylindrical shape elongated in the left-and-right direction. The pressing roller 21 includes a metal core 21A and an elastic layer 21B such as a silicon sponge laminated on the outer circumferential surface of the metal core 21A (see FIG. 3). A drive motor M is connected to the left end of the metal core 21A via a gear train (not shown) (see FIG. 2). The pressing roller 21 comes into contact with the fixing belt 20 from the lower side, and forms a pressure region N between the fixing belt 20 and the pressing roller 21. The pressure region N refers to a region from an upstream position where the pressure is 0 Pa to a downstream position where the pressure becomes 0 Pa again via a position where the pressure acts.

The paper P is conveyed such that the center of the width in the left-and-right direction substantially coincides with the center of the pressure region N in the left-and-right direction (axial direction). For this reason, in the fixing belt 20 (or the pressure region N), a passing region A1 which is a center region in the axial direction and is in contact with the paper P, and non-passing regions A2 which are both outer regions in the axial direction and is not in contact with the paper P (see FIG. 4). The paper P to be conveyed always comes into contact with the vicinity of the center portion of the passing region A1 in the axial direction, regardless of a size (dimension in the left-and-right direction) of the paper P. On the other hand, the paper P of a normal size (for example, A4 size) is in contact with both the outer end portions on the outer end sides of the passing region A1 in the axial direction, but the paper P of a small size (for example, A5 size, B5 size) is not in contact with both the outer end portions.

<Heater> As shown in FIG. 3 and FIG. 4, the heater 23 extends in the left-and-right direction (axial direction) of the fixing belt 20, and is fitted into the fitting portion 22A of the heater holder 22. The heater 23 comes into contact with the inner surface of the fixing belt 20 facing the pressure region N, and heats the fixing belt 20. As shown in FIG. 4 and FIG. 5, the heater 23 includes a base board 30 and a heat generating part 31.

(Base Board) The base board 30 is made of insulator (electrical insulating material) such as ceramic, for example. The base board 30 is formed in a substantially rectangular plate shape extending in the left-and-right (axial) direction corresponding to the fixing belt 20. The base board 30 is formed slightly shorter in the axial direction than the fixing belt 20, and is disposed inside the fixing belt 20 (a space surrounded by the fixing belt 20) (see FIG. 6).

(Heating Part) The heat generating part 31 is provided on the lower surface of the base board 30 which is on the inner surface side of the fixing belt 20 (see FIG. 5). As shown in FIG. 4, the heat generating part 31 includes three resistance heating elements 32A to 32C arranged in a line in the left-and-right direction (axial direction) via gaps G. In the description common to the three resistance heating elements 32A to 32C in this specification, only arithmetic numeral is attached to the reference numerals. The gap G is set to an insulation distance (creeping distance) capable of preventing creeping discharge between the adjacent resistance heating elements.

The resistance heating element 32 is made of metal material having a high electrical resistance, and formed in a substantially rectangular shape. The entire heat generating part 31 is shorter than the full length of the fixing belt 20 in the left-and-right direction (axial direction) and is longer than the passing region A1 of the fixing belt 20 in the axial direction (see FIG. 4). In other words, the outer end portions of the resistance heating elements 32B and 32C located on both outer end sides in the axial direction face the non-passing regions A2 of the fixing belt 20 (see FIG. 4). A width of the resistance heating element 32A disposed in the center in the axial direction corresponds to the width of the small size paper P in the left-and-right direction, and a width of all the resistance heating elements 32A to 32C correspond to the width of the normal size paper P in the left-and-right direction.

Three individual electrodes 33A to 33C and a common electrode 33D are formed on the lower surface of the base board 30. The three individual electrodes 33A to 33C and the common electrode 33D are made of, for example, metal material having a lower electrical resistance value than the resistance heating element 32. In this specification, the description common to the three individual electrodes 33A to 33C and the common electrode 33D is simply referred to as the "electrode 33", and only arithmetic numeral is attached to the reference numerals.

As shown in FIG. 4, the individual electrode 33A is connected to the downstream end (rear end) of the resistance heating element 32A located at the center in the axial direction. The other individual electrodes 33B, 33C are connected to the downstream ends of the resistance heating elements 32B, 32C, respectively. The common electrode 33D is connected to the upstream ends (front ends) of all the resistance heating elements 32A to 32C. Each of the electrodes 33 extends from the portion connected to the heat generating part 31 to both outer end sides of the heat generating part 31 in the axial direction. The electrodes 33 are electrically connected to a device (not shown) such as a power source, on both the outer end sides of the base board 30 in the axial direction.

The heat generating part 31 and the electrodes 33 are covered with a coating layer 34 (see FIG. 5). The coating layer 34 is made of, for example, material such as ceramic having electrical insulation and having a small sliding friction force with respect to the inner surface of the fixing belt 20. The coating layer 34, the heat generating part 31, and the electrodes 33 can be formed on the base board 30 with high accuracy by, for example, a film forming technique such as sputtering, a printed circuit board manufacturing technique, a screen printing technique, or a combination of these techniques.

The heater 23 is fitted into the fitting portion 22A of the heater holder 22 with the heat generating part 31 (coating layer 34) facing the pressing roller 21, and the coating layer 34 is brought into contact with the inner surface of the fixing belt 20 (see FIG. 5). When the heater 23 receives the fixing belt 20 pressed against the pressing roller 21, the pressure region N is formed at a contact portion between the fixing belt 20 and the pressing roller 21.

<Heat Equalizing Member> Incidentally, since the fixing belt 20 has a smaller heat capacity than a roller or the like, the fixing device 7 employing the fixing belt 20 has an advantage that the warm-up time is shortened. However, for example, when the paper P of a small size is continuously subjected to the fixing process, excessive temperature rise can be suppressed in most of the passing region A1 of the fixing belt 20 because the paper P (toner image) absorbs heat, but excessive temperature rise may occur in both the axial outer end portions of the passing region A1 and the non-passing regions A2 where the paper P does not pass. Therefore, in the fixing device 7 according to the present embodiment, the heat equalizing member 26 is provided in the heater 23 in order to suppress the excessive temperature rise in the non-passing region A2 or the like of the fixing belt 20.

The heat equalizing member 26 is made of metal material such as an aluminum alloy. The heat equalizing member 26 is formed in a substantially rectangular plate shape extending in the axial direction corresponding to the fixing belt 20. As shown in FIG. 3 and FIG. 5, the heat equalizing member 26 is disposed inside of the fixing belt 20, and provided on (in contact with) the upper surface (one surface) of the heater 23 (base board 30) which is opposite to the fixing belt 20 (pressure region N). Lubricant such as silicon grease is applied between the heat equalizing member 26 and the base board 30. The lubricant brings the heat equalizing member 26 and the base board 30 into close contact, and facilitates the transfer of heat of the heater 23 to the heat equalizing member 26. The heat equalizing member 26 absorbs the heat emitted from the heater 23 and moves it in the axial direction. That is, the heat equalizing member 26 equalizes a temperature of the heater 23 in the axial direction. As a result, a temperature of the fixing belt 20 is also made uniform in the axial direction, and excessive temperature rise of the non-passing region A2 is suppressed. In the present specification, the term "uniform" does not mean only a state of being completely constant, but a slight difference is allowed.

The fixing device 7 is provided with a temperature detection 27 detects part which a temperature of the heater 23 and cuts off the power supply to the heater 23 when the detected temperature is an abnormal temperature. The temperature detection part 27 is a thermosensitive element, such as a thermal-cut, for example, and is provided in contact with the heater 23. In detail, the temperature detection part 27 is attached to the top surface of the fitting portion 22A of the heater holder 22, and the lower portion of the temperature detection part 27 is in contact with the top surface of the heat equalizing member 26 (see FIG. 3). The temperature detection part 27 is in contact with the axial center portion of the heat equalizing member 26 (not shown). The heater 23, the temperature detection part 27, and the drive motor M are electrically connected to a control device 8 and the power source (not shown). The control device 8 controls the power source, the heater 23 and the others as appropriate. The temperature detection part 27 is not limited to the thermal-cut, but may be a contact-type temperature sensor such as a thermocouple, platinum resistance thermometer, thermistor thermometer, or bimetal thermometer, for example.

[Operation of Fixing Device] Here, the operation (fixing process) of the fixing device 7 will be described. The control device 8 controls the drive motor M to rotate the pressing roller 21 around the axis. The fixing belt 20 rotates in accordance with the pressing roller 21 (see the arrow in FIG. 2). The control device 8 receives a detection signal from the temperature detection part 27, and controls the heater 23 (or the power source) so as to maintain the predetermined target temperature. The heater 23 (heat generating part 31) generates heat by being energized and heats the fixing belt 20 (pressure region N).

At this time, the control device 8 changes the three resistance heating elements 32A to 32C to be heated (energized) according to a size of the paper P. For example, when the paper P of a normal size passes through the pressure region N, the control device 8 performs control to heat all three resistance heating elements 32A to 32C. When the paper P of a small size passes through the pressure region N, the control device 8 perform control for heating one resistance heating element 32A. Thus, only a necessary portion of the fixing belt 20 (pressure region N) can be heated in accordance with the size of the paper P. As a result, the power used can be kept to a minimum. It is also possible to suppress excessive temperature rise at both outer end portions of the fixing belt 20 in the axial direction.

When a temperature of the fixing belt 20 (heater 23) reaches the target temperature, the control device 8 starts the image forming process already described. The paper P on which the toner image is transferred enters the pressure region N. The fixing belt 20 heats the toner (toner image) on the paper P passing through the pressure region N while rotating around the axis. The pressing roller 21 pressurizes the toner on the paper P passing through the pressure region N while rotating around the axis. Then, the toner image is fixed to the paper P, and a fixed image is formed on the paper P. The paper P on which the image is fixed is discharged to the paper discharge tray 4.

<Separation Member> In the fixing device 7, paper P that has passed through the pressure region N may stick to the surface of the pressing roller 21. Therefore, as shown in FIG. 3 and FIG. 6, the fixing device 7 of this embodiment is provided with a separation member 35 which comes into contact with the surface of the pressing roller 21 and peels the paper P that has passed through the pressure region N, from the surface of the pressing roller 21. The separation member 35 has a plurality (for example, four) of separation claws 36 (see FIG. 6). The four separation claws 36 are supported on a support shaft 37 extending parallel to the pressing roller 21, for example, on the downstream side of the pressure region N. The four separation claws 36 are arranged at equal axial gaps within the passing region A1 of the pressure region N (see FIG. 6). Although the four separation claws 36 are arranged at equal gaps, they may be arranged at unequal gaps. The support shaft 37 is supported by the frame (not shown) of the fixing device 7.

In detail, each of the separation claws 36 has a base end portion 36A and a tip end portion 36B. The base end portion 36A is attached to the support shaft 37. Each separation claw 36 extends from the support shaft 37 toward the pressing roller 21. The tip end portion 36B is in contact with the surface of the pressing roller 21. Each of the separation claws 36 is provided in an inclined posture from the downstream side to the upstream side in the rotating direction of the pressing roller 21. Each of the separation claws 36 is formed as a whole in a substantially triangular prismatic shape whose thickness gradually becomes thin from the base end portion 36A to the tip end portion 36B. Each of the separation claws 36 is formed in a spatula shape with the tip end portion 36B being thinner, and the tip end portion 36B is in contact with the surface of the pressing roller 21 in the vicinity of the pressure region N. The vicinity of the pressure region N refers, for example, to a position about 1 to 10 mm away from the downstream end of the pressure region N along the circumference of the pressing roller 21.

By the way, in the fixing device 7, the heater 23 heats the fixing belt 20, and the pressing roller 21 is also heated through the fixing belt 20. In order to ensure proper toner fixation on the paper P, it is important to maintain not only the surface temperature of the fixing belt 20 but also the surface temperature of the pressing roller 21 at a predetermined temperature. In the heater 23 described above, three resistance heating elements 32A to 32C and the two gaps G are arranged alternately in the axial direction, so the surface temperatures of the fixing belt 20 and the pressing roller 21 are slightly lower in the portion corresponding to the gaps G than in the portion corresponding to the resistance heating elements 32. If the separation member 35 (separation claws 36) is in contact with the surface of the pressing roller 21 at the position corresponding to the gaps G, the surface temperature of the pressing roller 21 will further decrease at the contact position of the separation member 35 because the separation member 35 absorbs heat from the surface of the pressing roller 21. This may result in a non-uniform temperature in the pressure region N in the axial direction, making it impossible to properly fix the toner on the paper P.

Therefore, in the fixing device 7 of this embodiment, as shown in FIG. 6, each separation claw 36 of the separation member 35 is in contact with the surface of the pressing roller 21 at a position axially displaced with respect to the gaps G. In other words, each separation claw 36 is arranged to avoid the gaps G of the resistance heating elements 32, and is in contact with the surface of the pressing roller 21 at the position corresponding to the resistance heating elements 32. In detail, the two separation claws 36 disposed in the center portion in the axial direction are in contact with the pressing roller 21 at the positions corresponding to the resistance heating element 32A disposed on the center side in the axial direction to peel the small size paper P from the surface of the pressing roller 21. The two separation claws 36 arranged on both outer sides of the axial direction are in contact with the pressing roller 21 at the positions corresponding to the resistance heating elements 32B, 32C disposed on the outer sides in the axial direction. The four separation claws 36 are provided to peel the normal size paper P from the surface of the pressing roller 21.

In the fixing device 7 of this embodiment described above, the three resistance heating elements 32A to 32C are arranged on the lower surface of the base board 30 with the gaps G in the axial direction, and each of the separation claws 36 of the separation member 35 is in contact with the surface of the pressing roller 21 at the position axially displaced with respect to the gaps G. According to this configuration, in the pressing roller 21, the position where the temperature becomes low due to the effect of the gaps G of the resistance heating elements 32 and the position where the temperature becomes low due to the effect of heat absorption by the separation member 35 (separation claws 36) can be shifted axially. This prevents one part of the surface of the pressing roller 21 (and fixing belt 20) in the axial direction from extremely decreasing. As a result, the temperature in the pressure region N is made uniform in the axial direction, enabling the proper fixing of the toner on the paper P.

In the fixing device 7 of this embodiment, the tip end portion 36B of the separation claw 36, which is formed in the shape of a spatula, is in contact with the surface of the pressing roller 21 in the vicinity of the downstream side of the pressure region N. According to this configuration, the paper P stuck to the surface of the pressing roller 21 can be efficiently peeled off. In addition, since the tip end portion 36B of the separation claw 36 is made thinner, the heat capacity of the separation claw 36 can be reduced, and the temperature drop of the surface of the pressing roller 21 at the contact area of the separation claws 36 can be suppressed.

In the fixing device 7 of this embodiment, the separation member 35 includes the four separation claws 36, but it is not limited to this and may have one to three separation claws 36 or five or more separation claws 36 (not shown). In other words, the separation member 35 needs only have at least one separation claw 36. In order to be able to handle the separation of all sizes of the paper P, one separation claw 36 should be provided in the axial center of the pressing roller 21.

In the fixing device 7 of this embodiment, the separation claw 36 is formed in a substantially triangular pillar shape, and the tip end portion 36B of the separation claw 36 is formed in a spatula shape, but it is not limited to this. For example, the separation claw 36 may be formed in a flat plate shape (not shown).

In the fixing device 7 of this embodiment, the heat generating part 31 is divided into three resistance heating elements 32A to 32C, but it is not limited to this, and may be divided into two, four or more, or not divided (all not shown). The heat generating part 31 may also be a single resistance heating element extending from one axial side to the other axial side, or a U-shaped resistance heating element that extends from one axial side to the other axial side and then folds to extend from the other axial side to one axial side (all not shown in the figure).

Further, in the fixing device 7 according to the present embodiment, the paper P passes through the center of the pressure region N in the axial direction, but it is not limited to this, and the paper P may pass through a position closer to one outer end side of the pressure region N in the axial direction (not shown). In this case, the non-passing region A2 is set only on the other outer end side in the axial direction of the fixing belt 20 (or the pressure region N).

In the fixing device 7 according to the present embodiment, although the pressing roller 21 is rotationally driven and the fixing belt 20 is driven to be rotated, the fixing belt 20 may be rotationally driven and the pressing roller 21 may be driven to be rotated.

In the description of the above-described embodiment, the present disclosure is applied to the monochrome image forming apparatus 1 as an example, but the present disclosure is not limited thereto, and may be applied to, for example, a color printer, a copying machine, a facsimile machine, or a multifunction machine.

It should be noted that the description of the above embodiments shows one aspect of the fixing device and the image forming apparatus according to the present disclosure, and the technical range of the present disclosure is not limited to the above embodiments. The present disclosure may be varied, replaced, and modified without departing from the spirit of the technical thought, and the scope of the claims includes all embodiments which may be included within the scope of the technical thought.

The invention claimed is:

1. A fixing device comprising:

a fixing belt formed in a cylindrical shape and rotating around an axis to heat toner on a medium;

a pressing member forming a pressure region with the fixing belt and pressurizing the toner on the medium passing through the pressure region while rotating around an axis;

a heater extending in the axial direction of the fixing belt, coming into contact with an inner surface of the fixing belt facing the pressure region, and heating the fixing belt; and a separation member which comes into contact with a surface of the pressing member and peels off the medium passed through the pressure region, from the surface of the pressing member, wherein the heater includes:

a base board made of insulator and extending in the axial direction corresponding to the fixing belt; and a plurality of resistance heating elements arranged on one surface of the base board, where faces an inner surface of the fixing belt, with gaps in the axial direction, and generating heat by being energized, and the separation member has a plurality of separation claws which are in contact with the surface of the pressing member at positions displaced in the axial direction relative to the gaps, the separation claw arranged in a center portion in the axial direction is in contact with the surface of the pressing member at the position corresponding to the resistance heating element disposed in a center portion in the axial direction, and the separation claws arranged on both outer sides of the center portion in the axial direction are in contact with the surface of the pressing member at the positions corresponding to the resistance heating elements disposed on the outer sides in the axial direction.

2. The fixing device according to claim 1, wherein the separation claw is formed in a spatula shape whose tip end portion is made thin, and the tip end portion is brought into contact with the surface of the pressing member in a vicinity of the pressure region.

3. An image forming apparatus comprising the fixing device according to claim 1.

4. The fixing device according to claim 1, wherein the separation member has four of the separation claws, the heater has three of the resistance heating elements, the two separation claws arranged in the center portion in the axial direction are in contact with the surface of the pressing member at the position corresponding to the resistance heating element disposed in a center portion in the axial direction, and the separation claws arranged on both outer sides of the center portion in the axial direction are in contact with the surface of the pressing member at the positions corresponding to the resistance heating elements disposed on the outer sides in the axial direction.

5. The fixing device according to claim 4, wherein the two separation claws arranged in the center portion in the axial direction peel the medium of small size from the surface of the pressing member, and the four separation claws peel the medium of normal size from the surface of the pressing member.

* * * * *